United States Patent
Singh et al.

(10) Patent No.: US 12,449,478 B2
(45) Date of Patent: Oct. 21, 2025

(54) LOW OVERHEAD LOOP BACK TEST FOR HIGH SPEED TRANSMITTER

(71) Applicant: STMicroelectronics International N.V., Geneva (CH)

(72) Inventors: Rupesh Singh, Ghaziabad (IN); Ankur Bal, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 290 days.

(21) Appl. No.: 18/168,496

(22) Filed: Feb. 13, 2023

(65) Prior Publication Data

US 2023/0266387 A1 Aug. 24, 2023

Related U.S. Application Data

(60) Provisional application No. 63/313,137, filed on Feb. 23, 2022.

(51) Int. Cl.
| | | |
|---|---|---|
| *G01R 31/317* | (2006.01) | |
| *G01R 31/28* | (2006.01) | |
| *H03M 9/00* | (2006.01) | |

(52) U.S. Cl.
CPC ... *G01R 31/31716* (2013.01); *G01R 31/2851* (2013.01); *G01R 31/31725* (2013.01); *H03M 9/00* (2013.01)

(58) Field of Classification Search
CPC .......... G01R 31/31716; G01R 31/2851; G01R 31/31725; G01R 31/00; H03M 9/00; H05K 1/18
See application file for complete search history.

(56) References Cited

U.S. PATENT DOCUMENTS

| | | |
|---|---|---|
| 6,865,222 B1 | 3/2005 | Payne |
| 7,363,563 B1 | 4/2008 | Hissen et al. |
| 8,275,025 B2 | 9/2012 | Abel et al. |
| 11,038,602 B1 | 6/2021 | Sun et al. |
| 11,165,554 B1 | 11/2021 | Huss et al. |
| 11,238,204 B1 * | 2/2022 | Huss .............. G01R 31/318385 |
| 2007/0160173 A1 * | 7/2007 | Takeuchi ................ H03M 9/00 375/355 |

* cited by examiner

*Primary Examiner* — Sam K Ahn
*Assistant Examiner* — Amneet Singh
(74) *Attorney, Agent, or Firm* — Seed Intellectual Property Law Group LLP

(57) ABSTRACT

An integrated circuit includes a serializer configured to receive first test data in n-bit words and to generate a single bit data stream by serializing the test data in accordance with a first clock signal. The integrated circuit includes testing circuitry configured to test the serializer without utilizing a deserializer.

20 Claims, 4 Drawing Sheets

LOW OVERHEAD LOOP BACK TEST FOR HIGH SPEED TRANSMITTER

BACKGROUND

Technical Field

The present disclosure is related to integrated circuits, and more particularly, to testing data output circuits of integrated circuits.

Description of the Related Art

Many integrated circuits output data to external circuit or devices. For example, an integrated circuit may pass data from an internal memory of the integrated circuit to a data output terminal of the integrated circuit. An integrated circuit may otherwise generate data to be provided to an output terminal of the integrated circuit.

In some cases, integrated circuits include serializers for high-speed data transmission links. A serializer receives data in multibit words in accordance with a relatively low frequency clock. The serializer then transforms the data into a single bit data stream in accordance with a high frequency clock. The serializer provides the single bit data stream to the output terminal of the integrated circuit. The serializers can be a very beneficial aspect of a high-speed data transmission link because they enable very high bit rate data streams to be provided on a single output terminal of an integrated circuit.

However, there also some drawbacks associated with the use of serializers. In particular, it can be very difficult to test a serializer to ensure that the serializer is functioning properly. Some potential serializer testing solutions incorporate testing circuits that consume large amounts of integrated circuit area. This can reduce the amount of integrated circuit area could otherwise be used to enhance the performance of the integrated circuit.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide an integrated circuit that can effectively test a serializer without consuming large amounts of integrated circuit area. The integrated circuit includes a test data generator that passes test data in a series of multibit words to the serializer in accordance with a low speed clock. The serializer generates a single bit data stream from the test data in accordance with a high-speed clock. The serializer also generates a plurality of phase signals having a same frequency as the low speed clock and having phases that are mutually offset from each other. A sampling circuit samples the single bit data stream in accordance with each of the phase signals in turn and passes the sampled data in a single bit test data stream to a signature generator. The signature generator generates a signature from the single bit test data stream and compares the signature to a reference signature. If the signature matches the reference signature, then the serializer is functioning accurately.

Each of the phase signals is aligned with a respective one of the bit places of the test data in the single bit stream. Accordingly, when the sampling circuit samples the single bit data stream in accordance with a first phase signal, the sampling circuit samples the bits associated with the first bit place of the words of the test data. When the sampling circuit samples the single bit data stream in accordance with a second phase signal, the sampling circuit samples the bits associated with the second bit place of the words of the test data. This continues until the sampling circuit has sampled each bit place of the words of the test data from the single bit data stream in accordance with each of the phase signals.

The sampling circuit outputs a single bit test data stream to the signature generator. The signature generator then generates the signature based on the single bit test data stream. The signature generator can then compare the signature to the reference signature and determine whether or not the serializer is functioning properly.

Testing the serializer as described above can be accomplished with very low area consumption. The sampling circuit and the phase selector consume very little integrated circuit area when generating a low-speed single bit test data stream that the signature generator can easily capture in order to generate a signature. Accordingly, embodiments of the present disclosure provide testing circuits for a serializer that are both highly accurate and consumes low amounts of area and power.

In one embodiment, a method includes receiving, at a serializer, first test data in a series of words and generating, at the serializer, a single bit data stream by serializing the test data in accordance with a first clock signal. The method includes generating, by dividing a frequency of the first clock signal, a plurality of phase signals offset from each other in phase and generating second test data by sampling the single bit data stream in accordance with each of the phase signals.

In one embodiment, an integrated circuit includes a serializer configured to receive first test data in n-bit words and to generate a single bit data stream by serializing the test data in accordance with a first clock signal. The integrated circuit includes a phase signal generator configured to generate, from the first clock signal, n phase signals each having a frequency of 1/nth a frequency of the first clock signal and out of phase with each other. The integrated circuit includes a phase selector configured to receive the n phase signals and to sequentially output the phase signals one at a time based on a phase selection signal. The integrated circuit includes a flip-flop configured to receive, on a clock terminal, the phase signals from the phase selector, and to receive the single bit data stream on a data input terminal.

In one embodiment, an integrated circuit includes a test data generator and a serializer. The serializer includes an input coupled to the test data generator and an output. The integrated circuit includes a phase selector including a plurality of inputs and an output. The integrated circuit includes a flip-flop including a clock input terminal coupled to the output of the phase selector, a data input terminal coupled to an output of the serializer, and a data output terminal.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
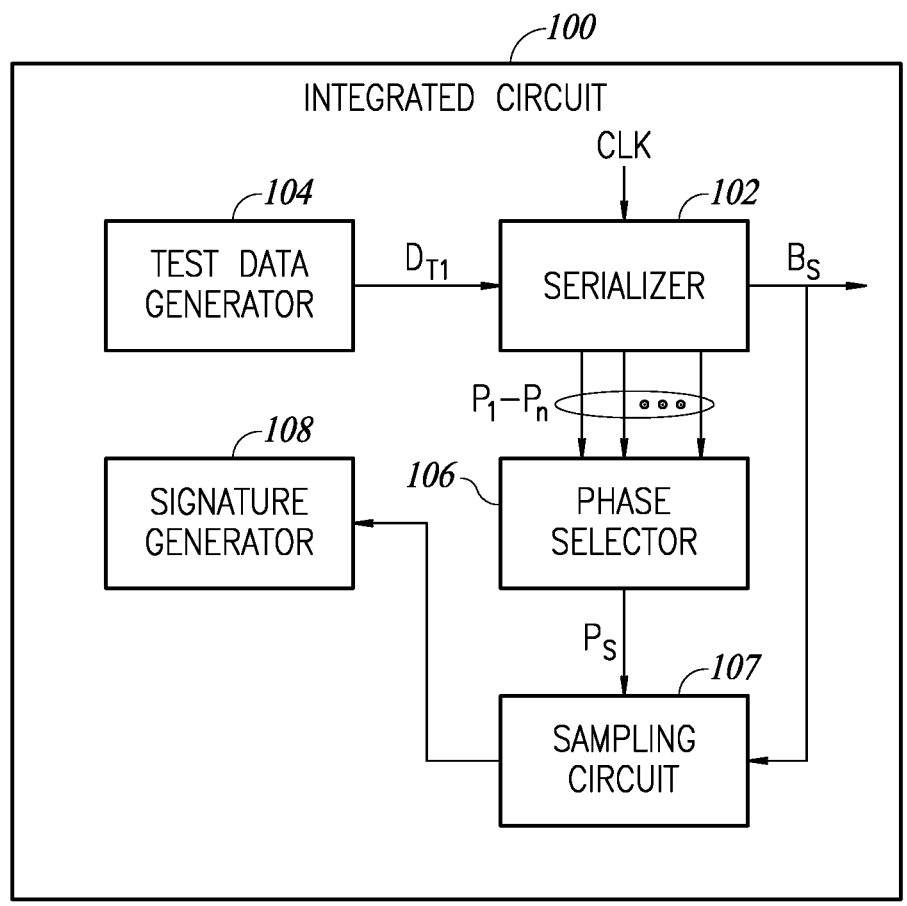
FIG. 1 is a block diagram of an integrated circuit including a serializer, according to one embodiment.

FIG. 1 is a block diagram of an integrated circuit 100, according to one embodiment. The integrated circuit 100 includes a serializer 102. As will be set forth in more detail below, the components of the integrated circuit 100 enable accurate and efficient testing of the serializer 102.

In one embodiment, the serializer 102 is part of a high-speed transmitter. The serializer 102 is capable of outputting a single bit data stream BS with a very high bit rate. The bit rate may be between 100 Mb/s and 20 Gb/s, though other bit rates may be utilized without departing from the scope of the present disclosure. The serializer 102 may output data to an output terminal of the integrated circuit 100. External devices coupled to the output terminal may receive the high-speed single bit data stream.

During operation, the serializer 102 receives data from other components of the integrated circuit. The data is received by the serializer in words. Each word includes multiple bits. Though not shown in FIG. 1, the serializer includes a respective input for each bit place of the word. For example, if each word is 10 bits, then the serializer 102 will include 10 inputs. When a word is received at the serializer 102, all of the bits of the word are received substantially simultaneously at the corresponding inputs. The function of the serializer 102 is to receive the multibit words and to generate a single bit data stream that includes all of the bits of the words.

The serializer 102 receives a clock signal CLK. The clock signal CLK is a high-speed clock. The serializer 102 outputs the single bit data stream BS with a bit rate corresponding to the frequency of the high-speed clock CLK. The serializer receives the data words in accordance with a low speed clock (not shown). The low speed clock may have a frequency 1/nth the frequency of the high-speed clock, where n is the number of bits in each word.

In one embodiment, the serializer 102 generates the low speed clock by passing the clock signal CLK to a frequency divider (not shown). The serializer 102 may then pass the low speed clock to a circuitry that provides the data words to the serializer 102. The block diagram of FIG. 1 is primarily directed to testing aspects of the serializer 102. Accordingly, the circuitry that provides data to the serializer 102 is shown in FIG. 1.

The integrated circuit 100 includes a test data generator 104. The test data generator 104 is utilized for testing the serializer 102. The test data generator 104 provides first test data DT1 to the serializer 102. In particular, the test data generator 104 provides the test data DT1 in multibit words. The test data DT1 can be provided to the serializer 102 at the same inputs by which the serializer receives data words during standard operation.

The test data generator 104 can generate or store a set of first test data DT1. The test data may be organized in m words of n bits each. The test data generator 104 can pass the test data DT1 to the serializer 102 in words until all m words have been passed to the serializer 102. As will be set forth in more detail below, the testing process of the serializer may include passing all m words multiple times to the serializer 102.

To assist in the testing process, the serializer 102 generates n phase signals P1-Pn. Each of the phase signals has a same frequency as the low speed clock. Indeed, the serializer 102 may generate the low speed clock and the phase signals by dividing the frequency of the high-speed clock CLK. The n phase signals are out of phase with each other. The serializer 102 generates the n phase signals such that each phase signal is aligned to have a rising edge corresponding to a respective bit place of the words in the single bit data stream BS. This can be understood by considering that when a word of data is received at the inputs of the serializer 102, each word has bit places b1-bn. The serializer 102 serializes them in order such that the single bit data stream outputs the bits of the word sequentially. Accordingly, if a word is received at the input of the serializer 102, the serializer will first output the data value of the first bit place, then the data value of the second bit of place, then the data value of the third bit place, until the data value of the nth place has been output. Another word is then received at the inputs of the serializer 102 and the serializer 102 again outputs the data values of the bit places sequentially. Accordingly, the single bit data stream outputs data in the following manner: b1, b2, b3 ... bn, b1, b2, b3 ... bn. Each of the phase signals is aligned so that an edge of the phase signal occurs in the bit window associated with a respective bit place. The phase signal P1 has a phase such that an edge of the phase signal P1 occurs while the bit place b1 is being output in the single bit data stream BS. The phase signal P2 has a phase such that an edge of the phase signal P2 occurs while the bit place b2 is being output in the single bit data stream BS. The phase signal Pn has a phase such that an edge of the phase signal P3 occurs while the bit place bn is being output in the single bit data stream BS.

The phase signals P1-Pn are all provided to a phase selector 106. The phase selector 106 outputs one of the phase signals P1-Pn at a time. The phase selector 106 receives a selection signal SS. The selection signal SS indicates which of the phase signals P1-Pn will be output by the phase selector 106. The phase selector 106 may correspond to a multiplexer, a switching circuit, or another type of circuit suitable to receive a plurality of inputs and selectively output one of the inputs of the time in accordance with a selection signal. Accordingly, the phase selector 106 outputs a selected phase signal PS corresponding to the currently selected phase signal in accordance with the selection signal SS.

While FIG. 1 illustrates that the serializer 102 provides the phase signals P1-Pn to the phase selector 106, the phase signals P1-Pn may be generated by a circuit other than the serializer 102. This other circuit may provide the phase signals P1-Pn to the phase selector 106.

The integrated circuit 100 includes a sampling circuit 107. The sampling circuit 107 has a data input coupled to the output of the serializer 102. In particular, the data input of the sampling circuit 107 receives the single bit data stream BS. The sampling circuit 107 includes a clock input terminal coupled to the output of the phase selector 106. Accordingly, the clock input terminal of the sampling circuit 107 receives the selected phase signal PS from the phase selector 106. The sampling circuit 107 includes a data output terminal. The sampling circuit 107 outputs whatever data value is present at the data input terminal upon the rising edge of the selected phase signal PS. The sampling circuit 107 outputs a single bit data stream corresponding to second test data DT2. Further details regarding this operation of the sampling circuit 107 are provided below.

The integrated circuit 100 includes a signature generator 108. The signature generator 108 includes an input coupled to the output of the sampling circuit 107. The signature generator 108 receives the second test data DT2 and generates a signature based on the second test data DT2. Accordingly, the signature will have a value based on the values of each of the bits from the second test data DT2.

In one embodiment, the signature generator 108 compares the signature to a reference signature. If the signature matches the reference signature, then the serializer 102 is operating correctly. If the signature does not match the reference signature, the serializer 102 is not operating correctly.

In one embodiment, the integrated circuit 100 can include a comparison circuit that compares the signature to the reference signature. The comparison circuit can be part of the signature generator 108. Alternatively, the comparison circuit can be separate from the signature generator 108.

In one example, a testing process includes passing the complete set of test data DT1 to the serializer 102 n times. Each time that the complete set of the test data DT1 is provided to the serializer 102, the selection signal SS causes the phase selector 106 to output a respective one of the phase signals P1-Pn for the duration. As set forth previously, each phase signal P1-Pn is aligned with one of the bit places in the single bit data stream BS. During a first instance of outputting the entire set of the test data DT1, the selection signal SS selects the first phase signal P1. Each complete set of the test data DT1 is output in m words. Because the phase signal P1 is aligned with the first bit place of the words, each time a word of the test data serializer, the sampling circuit 107 captures the first bit place and outputs the corresponding data value to the signature generator 108.

After the complete set of the test data DT1 has been passed to the serializer one for the first time, the selection signal SS causes the phase selector 106 to select the second phase signal P2 as the selected phase signal PS. While the test data DT1 has been passed to the serializer 102 for the second time, the sampling circuit 107 captures the second bit place of each word from the single bit data stream BS. The sampling circuit 107 outputs the data values of the second bit place to the signature generator 108.

This process continues until the complete set of the first test data DT1 has been passed to the serializer 102 n times and each phase signal P1-Pn has been selected for the duration of one complete set of the first test data DT1. The result is that every bit of the first test data DT1 has been passed to the signature generator 108 in the second test data DT2. Rather than capturing all of the bits of the test data DT1 with the sampling circuit 107 after passing the test data DT1 to the serializer a single time, 1/n of the first test data DT1 is captured during each of n complete sets of the test data DT1. While this results in the test data DT1 being passed multiple times, the process is still relatively quick. Furthermore, the phase selector 106 and the sampling circuit 107 consume a very small amount of area in the integrated circuit 100.

Figure 2:
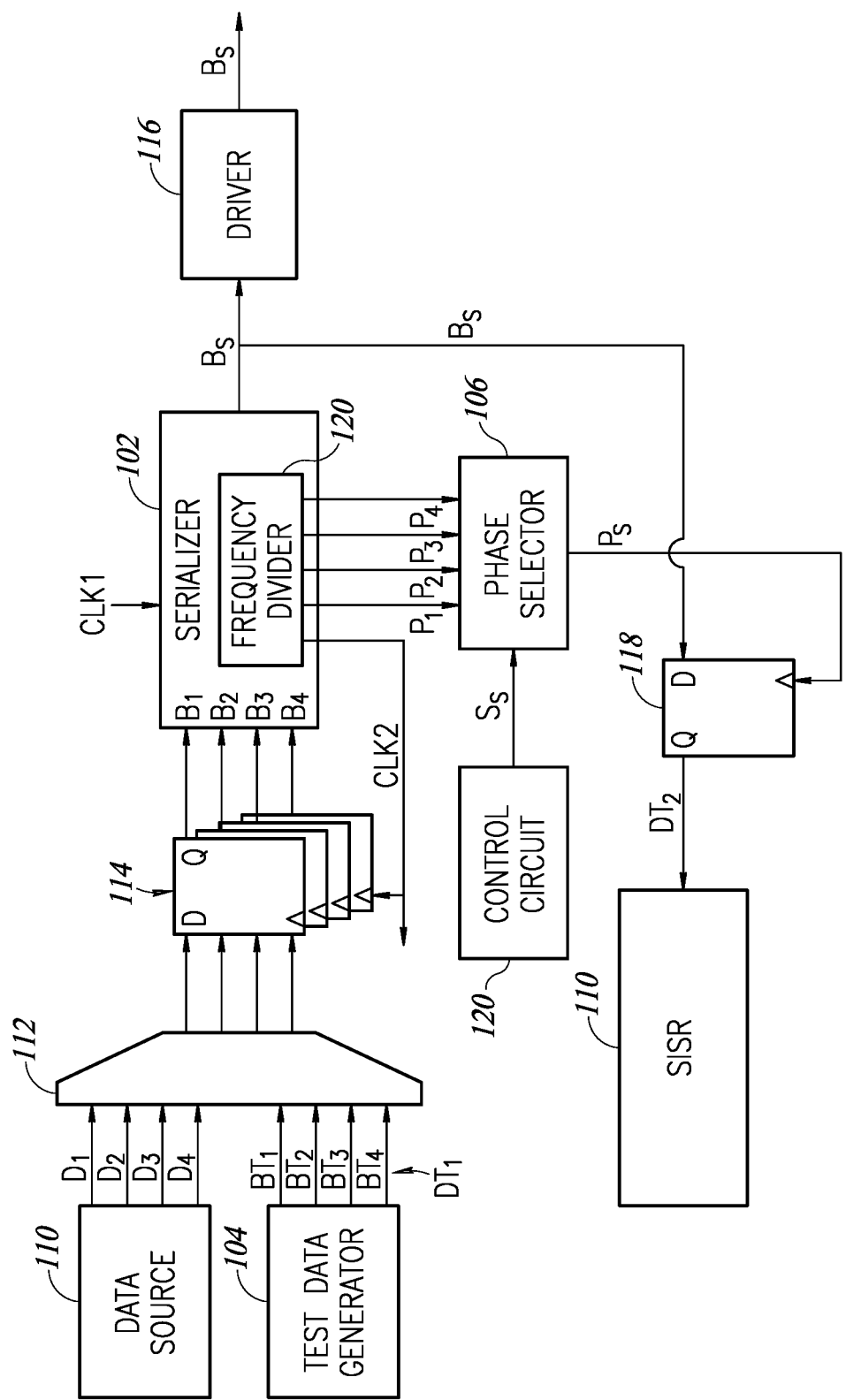
FIG. 2 is a schematic diagram of an integrated circuit including a serializer, according to one embodiment.

FIG. 2 is a schematic diagram of an integrated circuit 100, according to one embodiment. The integrated circuit 100 includes a serializer 102 and a data source 109. The data source 109 outputs data in multibit words. In the example of FIG. 2, each word has four bits. However, each word can have other numbers of bits without departing from the scope of the present disclosure. Each word of data output by the data source 109 house bit places D1-D4.

The integrated circuit 100 includes a multiplexer 112. The multiplexer 112 receives data words from the data source 109 and test data words from the test data generator 104, as will be set forth in more detail below. During standard operation of the integrated circuit 100, the multiplexer 112 outputs the data words from the data source 109. During a testing operation of the integrated circuit 100, the multiplexer 112 outputs words of the first test data DT1. The output of the multiplexer 112 can be controlled by a selection signal. Circuits other than a multiplexer 112 can be utilized for switching between data and test data without departing from the scope of the present disclosure.

The integrated circuit 100 includes a plurality of flip-flops 114. In the example in which the data words include four bits, there are four flip-flops 114. Each flip-flop has a data input terminal D, a data output terminal Q, and the clock input terminal. The data input terminal of each flip-flop 114 receives a respective bit place of the words output by the multiplexer 112.

The serializer 102 includes four inputs B1-B4, one for each bit place of the words received from the data source 109 or the test data generator 104 via the flip-flops 114. The serializer 102 also receives a high-speed clock signal CLK1.

The serializer one generates a single bit data stream BS by serializing the bit places in each word received at the inputs B1-B4.

The serializer 102 also includes a frequency divider 120. The frequency divider 120 generates a low-speed clock signal CLK2 by dividing the frequency of the high-speed clock signal CLK1 by four. The frequency division ratio depends on the number of bits in each word. If, for example, the words are 10 bits each, the frequency division ratio will be 10, as will the number of bit place inputs to the serializer 102. The serializer 102 passes the low-speed clock signal CLK2 to the clock input terminals of the flip-flops 114.

The integrated circuit 100 includes a driver 116. The driver 116 receives the single bit data stream BS from the serializer 102. The driver 116 drives the single bit data stream BS onto an output terminal of the integrated circuit 100. The driver 116 can include a combination of N-type transistors and P-type transistors having drain terminals coupled to each other and to the output terminal of the integrated circuit 100.

Returning now to a testing aspect of the serializer 102, the test data generator 104 generates first test data DT1. The test data generator 104 outputs the first test data DT1 in four-bit words. The test data generator 104 has four outputs the each output a respective bit BT1-BT4 of the words. In the example used herein, the test data DT1 includes five words. However, in practice, the test data DT1 may include a large number of words each having a large number of bits. The example of four bits per word and five words total for a set of first test data DT1 is given only for ease and illustrating principles of the present disclosure.

The test data generator 104 outputs each word to the multiplexer 112. In a testing operation of the serializer 102, the multiplexer 112 will output the words of the test data DT1 to the flip-flops 114. The flip-flops one and pass the words of the test data DT1 to the inputs B1-B4 of the serializer 102.

The frequency divider 120 of the serializer one also generates four phase signals P1-P4. Each of the four phase signals has the same frequency as the low-speed clock CLK two. The four phase signals are out of phase with each other. The phase of each of the phase signals is aligned to a respective bit place of the words of the test data in the single bit data stream BS. This can be more easily understood with reference to FIG. 3, described further below.

The integrated circuit 100 includes a phase selector 106. The phase selector 106 receives each of the phase signals P1-P4 from the serializer 102. A control circuit 120 outputs a selection signal SS to the phase selector 106. The selection signal SS identifies which of the phase signals should be output by the phase selector 106. The phase selector 106 then outputs the selected phase signal PS based on the selection signal SS.

The integrated circuit includes a flip-flop 118. The flip-flop 118 is one example of a sampling circuit 107 of FIG. 1. The flip-flop 118 includes a clock input terminal that receives the selected phase signal PS. The flip-flop 118 includes a data input terminal D that receives the single bit data stream BS from the output of the serializer 102. The flip-flop 118 includes a data output terminal Q that outputs second test data DT2.

The integrated circuit includes a single input signature register (SISR) 110. The SISR is one example of a signature generator 108 of FIG. 1. The input of the SISR 110 receives the second test data DT2 from the output of the flip-flop 118. The SISR generates a signature based on the data values of the second test data DT2.

Figure 3:
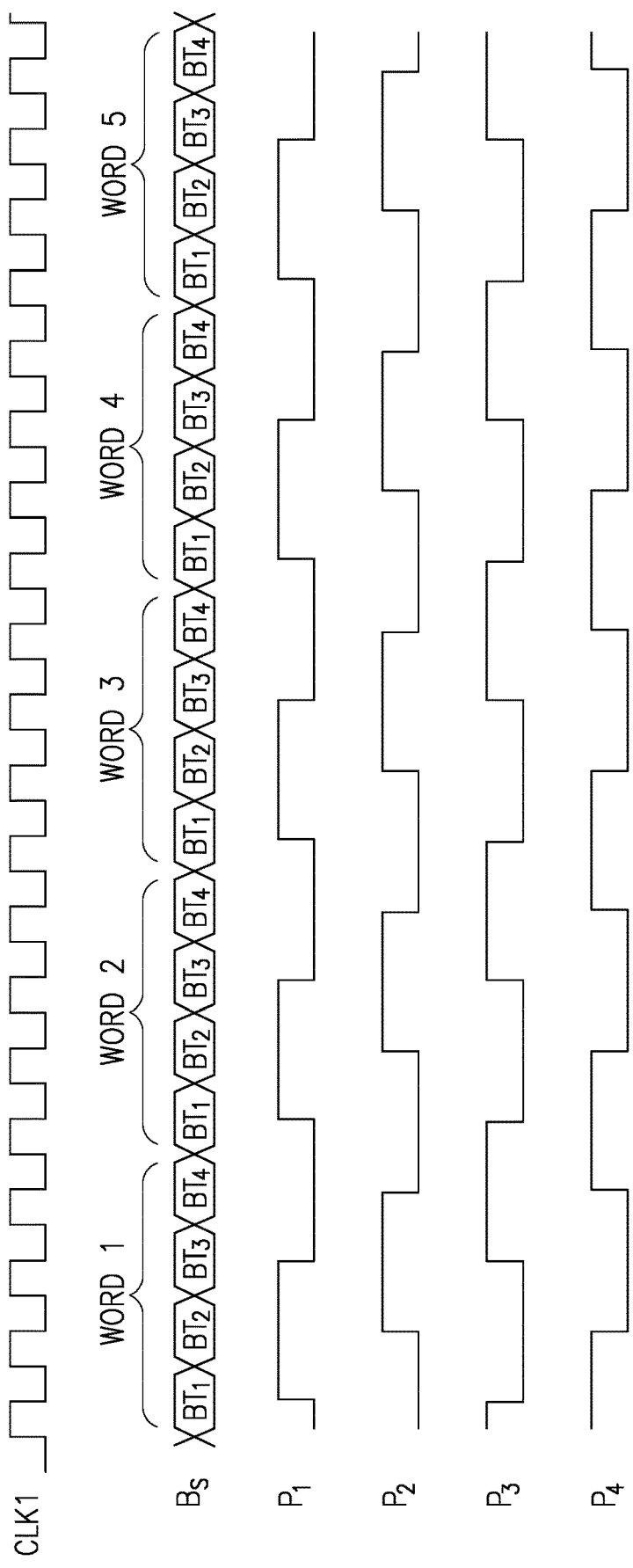
FIG. 3 includes timing diagrams of signals associated with testing a serializer, according to one embodiment.

In order to understand a testing operation of the integrated circuit 100 of Figure two, it is beneficial to refer briefly to Figure three. FIG. 3 illustrates serialization of a complete set of the test data DT1 by the serializer 102. As described previously, in the example of FIGS. 2 and 3 the complete set of test data has five words of four bits each, though in practice the number of bits per word and the number words in the test data DT1 may be much larger.

FIG. 3 illustrates the high-speed clock signal CLK1. The high-speed clock signal CLK1 corresponds, generally, to a square wave with a high frequency. The high-speed clock CLK1 can have other characteristics without departing from the scope of the present disclosure.

FIG. 3 illustrates the single bit data stream BS generated from a complete set of the first test data DT1. As described previously, the test data is provided to the serializer in five words of four bits each. Each word has four bit places BT1-BT4. After serialization by the serializer 102, the test data DT1 is in the single bit data stream BS. Each bit place may have a value of 0 or 1, though particular values are not illustrated in FIG. 3.

FIG. 3 illustrates the phase signals P1-P4. The phase of the first phase signal P1 is aligned so that the rising edge of the phase signal P1 occurs during each bit place BT1 in the single bit data stream BS. The phase of the second phase signal P2 is aligned so that the rising edge of the phase signal P2 occurs during each bit place BT2 in the single bit data stream BS. The phase of the third phase signal P3 is aligned so that the rising edge of the phase signal P3 occurs during each bit place BT3 in the single bit data stream. The phase of the fourth phase signal P4 is aligned so that the rising edge of the phase signal P4 occurs during each bit place BT four in the single bit data stream. The alignment of the phase signals will assist in testing the accuracy of the serializer, as will be described in more detail below.

Returning to FIG. 2, during a testing operation of the serializer 102, the test data generator 104 outputs a complete set of test data four times. In particular, the test data generator 104 outputs a complete set of the test data DT1 for each of the four bit places in each word of the test data DT1.

During the first time that the test data generator 104 outputs the complete set of test data, the selection signal SS selects the first phase signal P1. This causes the phase selector 106 to provide the first phase signal P1 to the clock input terminal of the flip-flop 118. Because the rising edge of the first phase signal P1 occurs during a window associated with BT1 in the single bit data stream BS, the flip-flop 118 captures all five of the values associated with BT1 during the first time that the test generator 104 outputs the test data DT1. Accordingly, the first five values of DT2 output by the flip-flop 118 corresponds to the five values of BT1 for the five words of a complete set of the test data DT1.

After the first time that the test data generator 104 outputs the complete set of the test data, the test data generator 104 outputs the complete set of the test data DT1 for a second time. During the second time that the test data generator 104 outputs the complete set of test data, the selection signal SS selects the second phase signal P2. This causes the phase selector 106 to provide the second phase signal P2 to the clock input terminal of the flip-flop 118. Because the rising edge of the second phase signal P2 occurs during a window associated with BT2 in the single bit data stream BS, the flip-flop 118 captures all five of the values associated with BT2 during the second time that the test generator 104 outputs the test data DT1. Accordingly, the second five values of DT2 output by the flip-flop 118 corresponds to the five values of BT2 for the five words of a complete set of the test data DT1.

After the second time that the test data generator 104 outputs the complete set of the test data, the test data generator 104 outputs the complete set of the test data DT1 for a third time. During the third time that the test data generator 104 outputs the complete set of test data, the selection signal SS selects the third phase signal P3. This causes the phase selector 106 to provide the third phase signal P3 to the clock input terminal of the flip-flop 118. Because the rising edge of the third phase signal P3 occurs during a window associated with BT3 in the single bit data stream BS, the flip-flop 118 captures all five of the values associated with BT3 during the third time that the test generator 104 outputs the test data DT1. Accordingly, the third five values of DT2 output by the flip-flop 118 corresponds to the five values of BT3 for the five words of a complete set of the test data DT1.

After the third time that the test data generator 104 outputs the complete set of the test data, the test data generator 104 outputs the complete set of the test data DT1 for a fourth time. During the fourth time that the test data generator 104 outputs the complete set of test data, the selection signal SS selects the fourth phase signal P4. This causes the phase selector 106 to provide the fourth phase signal P4 to the clock input terminal of the flip-flop 118. Because the rising edge of the fourth phase signal P4 occurs during a window associated with BT4 in the single bit data stream BS, the flip-flop 118 captures all five of the values associated with BT4 during the fourth time that the test generator 104 outputs the test data DT1. Accordingly, the final five values of DT2 output by the flip-flop 118 corresponds to the five values of BT4 for the five words of a complete set of the test data DT1.

After the complete set of the test data DT1 has been output four times, the SISR 110 has received all the data values of the complete set of the test data. The SISR 110 generates a signature based on the data values of the test data. The SISR 110, or another circuit, compares the signature to a reference signature. If the signature matches the reference signature, then the SISR 110 indicates that the serializer 102 is accurately serializing the data. If the signature does not match the reference signature, then the SISR 110 indicates that the serializer 102 is not accurately serializing the data. The SISR 110 can raise a flag.

In one embodiment, the SISR can generate a signature after each time that a complete set has been uploaded. The SISR 110 can then compare the signature to a reference signature. The SISR 110 can store a respective reference signature associated with each round of passing the complete set of test data to the serializer 102. If the first round signature does not match the first round reference signature, this indicates that the serializer one is not accurately serializing the first bit of each word. If the first round signature matches the first reference signature, the second round signature does not match the second round signature, this indicates that the serializer 102 is not accurately serializing the second bit of each word. If the second round signature matches the second round reference signature, but the third round reference signature does not match the third round reference signature, this indicates that the serializer 102 is not accurately serializing the third bit of each word. If the third round signature matches the third round reference signature, but the fourth round reference signature does not match the fourth round reference signature, this indicates that the serializer 102 is not accurately serializing the fourth date of each word. Accordingly, having reference signatures associated with each round of passing the complete set of the test data DT1 enables the SISR 110 to determine exactly where the serializer 102 is failing.

Figure 4:
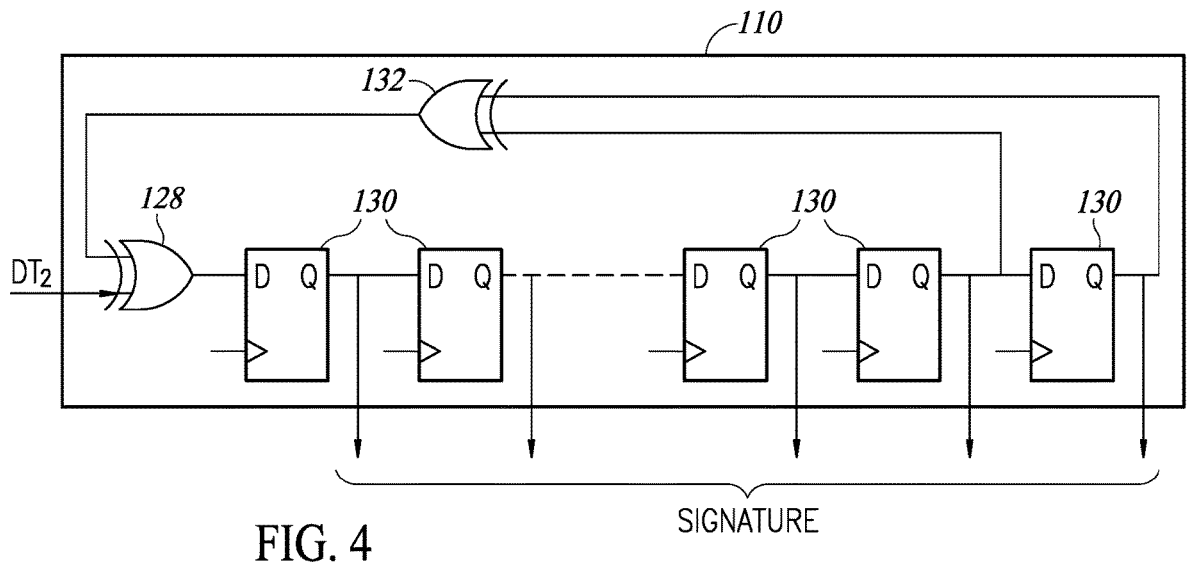
FIG. 4 is a schematic diagram of a single input signature register, according to one embodiment.

FIG. 4 is an illustration of an SISR 110, according to one embodiment. The SISR 110 is one example of an SISR 110 of FIG. 2. This SISR 110 of FIG. 4 includes an XOR gate 128 having a first input that receives DT2 from the flip-flop 118. The SISR 110 includes a plurality of flip-flops 130 connected in series. A first-flip flop 130 has an input coupled to the output of the XOR gate 128. The data output of each flip-flop 130 corresponds to a respective bit value of the current state of the signature. Each of the flip-flops 130 includes a clock input terminal that receives the low speed clock signal CLK2. The SISR 110 includes a second XOR gate 132 having a first input coupled to the data output terminal of the second to last flip-flop 130. The XOR gate 132 has a second input coupled to the data output terminal of the last flip-flop 130. The output of the XOR gate 132 is coupled to the input of the first XOR gate 128. The SISR 110 can have other configurations without departing from the scope of the present disclosure.

Figure 5:
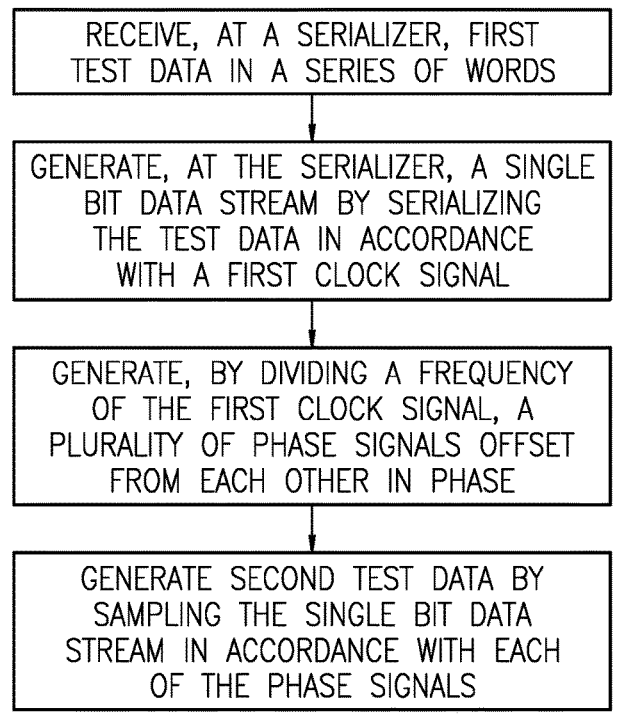
FIG. 5 is a flow diagram of a method of operating an integrated circuit, according to one embodiment.

FIG. 5 is a flow diagram of a method 500 for operating an integrated circuit, according to one embodiment. The method 500 can utilize the components, systems, and processes described in relation to FIGS. 1-4. At 502, the method 500 includes receiving, at a serializer, first test data in a series of words. At 504, the method 500 includes generating, at the serializer, a single bit data stream by serializing the test data in accordance with a first clock signal. At 506, the method 500 includes generating, by dividing a frequency of the first clock signal, a plurality of phase signals offset from each other in phase. At 508, the method 500 includes generating second test data by sampling the single bit data stream in accordance with each of the phase signals.

In one embodiment, a method includes receiving, at a serializer, first test data in a series of words and generating, at the serializer, a single bit data stream by serializing the test data in accordance with a first clock signal. The method includes generating, by dividing a frequency of the first clock signal, a plurality of phase signals offset from each other in phase and generating second test data by sampling the single bit data stream in accordance with each of the phase signals.

In one embodiment, an integrated circuit includes a serializer configured to receive first test data in n-bit words and to generate a single bit data stream by serializing the test data in accordance with a first clock signal. The integrated circuit includes a phase signal generator configured to generate, from the first clock signal, n phase signals each having a frequency of 1/nth a frequency of the first clock signal and out of phase with each other. The integrated circuit includes a phase selector configured to receive the n phase signals and to sequentially output the phase signals one at a time based on a phase selection signal. The integrated circuit includes a flip-flop configured to receive, on a clock terminal, the phase signals from the phase selector, and to receive the single bit data stream on a data input terminal.

In one embodiment, an integrated circuit includes a test data generator and a serializer. The serializer includes an input coupled to the test data generator and an output. The integrated circuit includes a phase selector including a plurality of inputs and an output. The integrated circuit includes a flip-flop including a clock input terminal coupled to the output of the phase selector, a data input terminal coupled to an output of the serializer, and a data output terminal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
  dividing a first clock signal having a first frequency to obtain a second clock signal having a second frequency lower than the first frequency;
  providing first test data in a series of words to a serializer in accordance with the second clock signal;
  generating, at the serializer, a single bit data stream by serializing the test data in accordance with the first clock signal;
  generating a plurality of phase signals offset from each other in phase and each having the second frequency; and
  generating second test data by sampling the single bit data stream in accordance with each of the plurality of phase signals.

2. The method of claim 1, comprising determining an accuracy of the serializer based on the test data.

3. The method of claim 2, wherein determining an accuracy of the serializer includes:
  generating a signature from the second test data; and
  comparing the signature to a reference signature based on the first test data.

4. The method of claim 3, comprising:
  passing the second test data to a serial input signature register; and
  generating the signature with the serial input signature register.

5. The method of claim 2, wherein generating the second test data includes:
  receiving the single bit data stream a data input terminal of a flip-flop;
  receiving, at a clock terminal of the flip flop, each of the plurality of phase signals sequentially.

6. The method of claim 5, wherein each word includes n bits, wherein the plurality of phase signals includes n phase signals, where n is an integer number.

7. The method of claim 6, wherein each of the n-phase signals is aligned to enable the flip-flop to capture, from the single-bit data stream, a respective bit-place of the words.

8. The method of claim 7, wherein the first test data includes m words, where m is an integer number, wherein generating the second test data includes capturing, for each phase signal, m bits from the single bit data stream.

9. The method of claim 8, comprising:
  receiving the m words of the first test data at the serializer n times;
  capturing m bits of the first test data from the single bit data stream with each phase signal; and
  switching to a next phase signal at the clock terminal each time the m words of the first test data have been serialized by the serializer.

10. An integrated circuit, comprising:
  a phase signal generator configured to receive a first clock signal having a first frequency, to generate a second clock signal having a second frequency lower than the first frequency by diving the first clock signal, and to generate a plurality of phase signals each having the second frequency;
  a test data generator configured to output first test data in accordance with the second clock signal;
  a serializer configured to generate a single bit data stream by serializing the first test data in accordance with the first clock signal, the serializer including:
    an input coupled to the test data generator and configured to receive the test data; and
    an output configured to output the single bit data stream;
  a phase selector including:
    a plurality of inputs each configured to receive a respective phase signal of the plurality of phase signals; and
    an output configured to output a selected phase signal of the plurality of phase signals;
  a flip-flop including:
    a clock input terminal coupled to the output of the phase selector and configured to receive the selected phase signal;
    a data input terminal coupled to an output of the serializer; and
    a data output terminal.

11. The integrated circuit of claim 10, comprising a single input signature generator including an input coupled to the data output terminal of the flip-flop.

12. The integrated circuit of claim 11, wherein the test generator is configured to provide first test data in n-bit words to the input of the serializer, where n is an integer number.

13. The integrated circuit of claim 12, wherein the phase signal generator is configured to generate, from the first clock signal, n phase signals each having a frequency of 1/nth a frequency of the first clock signal and out of phase with each other.

14. The integrated circuit of claim 12, wherein the phase selector receives at its inputs the n phase signals and outputs one of the n phase signals to the clock terminal of the flip-flop based on a phase selection signal.

15. The integrated circuit of claim 14, wherein the flip flop generates second test data from the single bit data stream by capturing with each of the n phase signals a respective portion of the first data.

16. The integrated circuit of claim 11, wherein the single input signature generator is configured to generate a signature from the second test data.

17. The integrated circuit of claim 16, comprising a comparison circuit configured to compare the signature to a reference signature based on the first test data.

18. An integrated circuit, comprising:
  a phase signal generator configured to generate, from a first clock signal having a first frequency, a second clock signal and n phase signals each having a second frequency that is 1/nth a frequency of the first clock signal, the n phase signals being out of phase with each other, where n is an integer number;
  a test data generator configured to output first test data in n-bit words in accordance with the second clock signal;
  a serializer configured to receive the first test data from the test data generator and to serialize the test data in accordance with the first clock signal to generate a single bit data stream;

a phase selector configured to receive the n phase signals and to sequentially output the n phase signals one at a time based on a phase selection signal; and a flip-flop configured to receive, on a clock terminal, the n phase signals from the phase selector, and to receive the single bit data stream on a data input terminal.

19. The integrated circuit of claim 18, wherein the flip flop is configured to generate second test data by sampling the single bit data stream in accordance with each of the n phase signals.

20. The integrated circuit of claim 19, comprising a single input signature register configured to receive the second test data and to generate a signature from the second test data.

* * * * *